United States Patent
Roberts et al.

(10) Patent No.: US 8,085,977 B2
(45) Date of Patent: *Dec. 27, 2011

(54) METHODS, SYSTEMS, AND PRODUCTS FOR GESTURE-ACTIVATION

(75) Inventors: Linda Ann Roberts, Decatur, GA (US); Hong Thi Nguyen, Atlanta, GA (US); Edward Michael Silver, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/695,254

(22) Filed: Jan. 28, 2010

(65) Prior Publication Data

US 2010/0131905 A1     May 27, 2010

Related U.S. Application Data

(63) Continuation of application No. 12/247,244, filed on Oct. 8, 2008, now Pat. No. 7,680,298, which is a continuation of application No. 11/788,212, filed on Apr. 19, 2007, now Pat. No. 7,444,001, which is a continuation of application No. 11/206,432, filed on Aug. 18, 2005, now Pat. No. 7,236,611, which is a continuation of application No. 09/965,906, filed on Sep. 28, 2001, now Pat. No. 6,937,742.

(51) Int. Cl.
*G06K 9/00* (2006.01)
*H04M 3/00* (2006.01)
*G06F 3/033* (2006.01)

(52) U.S. Cl. ......... 382/100; 382/103; 715/863; 455/420

(58) Field of Classification Search .................. 382/100, 382/103, 107, 155, 187, 307; 345/86, 158, 345/169, 173, 863; 455/419, 420, 456.1, 455/456.2, 456.3; 700/12, 13; 715/863
See application file for complete search history.

(56) References Cited

U.S. PATENT DOCUMENTS

| | | | |
|---|---|---|---|
| 6,681,031 B2 * | 1/2004 | Cohen et al. | 382/103 |
| 7,058,204 B2 * | 6/2006 | Hildreth et al. | 382/103 |

* cited by examiner

*Primary Examiner* — Yon Couso
(74) *Attorney, Agent, or Firm* — Scott P. Zimmerman PLLC

(57) ABSTRACT

Methods, systems, and products are disclosed for operating home appliances using gesture recognition. A sequence of video images is received and compared to a stored sequence of gesture images. A gesture image is associated to an operation of an appliance.

20 Claims, 3 Drawing Sheets

METHODS, SYSTEMS, AND PRODUCTS FOR GESTURE-ACTIVATION

CROSS-REFERENCE TO RELATED APPLICATIONS

This application is a continuation of U.S. application Ser. No. 12/247,244, filed Oct. 8, 2008, and now issued as U.S. Pat. No. 7,680,298, which is a continuation of U.S. application Ser. No. 11/788,212, filed Apr. 19, 2007, and now issued as U.S. Pat. No. 7,444,001, which is a continuation of U.S. application Ser. No. 11/206,432, filed Aug. 18, 2005, and now issued as U.S. Pat. No. 7,236,611, which is a continuation of U.S. application Ser. No. 09/965,906, filed on Sep. 28, 2001, now issued as U.S. Pat. No. 6,937,742, which are all incorporated herein by reference in their entirety.

FIELD OF THE INVENTION

The present invention relates to gesture recognition systems. More particularly, the present invention relates to systems and methods for operating a home appliance using gesture recognition.

BACKGROUND OF THE INVENTION

Voice activated technology is a rapidly developing area of the computer world. Today, many devices incorporate voice activation technology so certain functions of the device can be performed based on voice commands. For example, many home appliances are equipped with voice-activated technology as to allow a consumer to orally command, for example, a lighting system to power on by using voice commands. Such a feature is particularly advantageous when a person cannot manually activate a device because their hands are occupied or the device switch is in an inconvenient place.

For example, one may be carrying groceries into a house and is unable to manually activate the light switch, consequently, if the lighting system in the house has voice activated technology therein, the person may simply say, for example, "lights on" to activate the lights. This technology saves the person the trouble from having to put the groceries down, manually activate the lights, and then pick up the groceries. The ability to use voice-activated technology, of course, presumes that the user is able to speak. Consequently, those persons who cannot speak cannot take advantage of voice-activated technology.

Gesture recognition is another rapidly developing area in the computer world. Gesture recognition is not based on voice commands but, rather, allows a device to recognize certain gestures. The inventors, however, are not aware of any gesture recognition systems that are used in conjunction with the operation of home appliances. Therefore, there is a need for systems and methods that use gesture recognition to operate home appliances.

BRIEF SUMMARY OF THE INVENTION

The present invention satisfies the aforementioned need by providing systems and methods for using gesture recognition to operate a home appliance. In one embodiment of the present invention, an apparatus recognizes a gesture and then causes a home appliance operation associated with the gesture to be performed. For example, a first gesture might be associated with powering on a home appliance and a second gesture might be associated with powering off the home appliance. In this manner, a user can simply gesticulate to operate a home appliance rather than operating the appliance manually.

Apparatus according to the invention for operating a home appliance can include an image receiver, an image processor, an operations processor, and an appliance controller. The image receiver, which can be a video camera, for example, receives a continuous stream of images of a gesture performed within the image receiver's field of view and provides a video signal to the image processor. The video signal contains information corresponding to the continuous stream of gesture images. The image processor receives the video signal and recognizes the gesture based on the information contained in the video signal.

The image processor can include an image sampler and an image comparator. The image sampler can be used for sampling the continuous stream of gesture images to form a discrete sequence of gesture images. The image comparator can then compare the discrete sequence of gesture images to each of one or more stored discrete gesture sequences, and recognize the gesture based on the comparison.

The operations processor is coupled to the image processor for identifying a home appliance operation associated with the gesture. The operations processor can identify the home appliance operation by comparing the recognized gesture with each of a predefined set of gestures. Each of the predefined gestures is associated with a respective home appliance operation.

The appliance controller is coupled to the operations processor for causing the home appliance operation to be performed. The apparatus can include a switch that is coupled to the appliance controller and is adapted to be coupled to the home appliance. The switch is responsive to the appliance controller for causing the home appliance operation to be performed. The appliance controller can be a voltage generator for generating a voltage signal, or a pulse generator for generating a voltage pulse, that causes the home appliance operation to be performed.

The apparatus can also include a performance indicator for providing an indication that the home appliance operation has been performed. A data store, readable by the image process, or storing data representative of the gesture and of the home appliance operation.

BRIEF DESCRIPTION OF THE SEVERAL VIEWS OF THE DRAWING

Other features of the present invention are further apparent from the following detailed description of the embodiments of the present invention taken in conjunction with the accompanying drawings, of which.

DETAILED DESCRIPTION OF THE PRESENT INVENTION

The present invention is directed to systems and methods for operating a home appliance using the principles of gesture recognition technology. In this manner, a person may turn on an oven, for example, by performing a recognizable gesture associated with turning on the oven. Similarly, the person may also turn off the oven, set the oven temperature, turn on the oven light, or cause the oven to perform any other operation by performing a gesture associated with respective operation. Consequently, a user can gesticulate to operate a home appliance rather than manually activate a switch or a button to operate the home appliance.

The present invention relates to apparatuses and methods for operating a home appliance. The apparatus may be a computer, in whole or in part, specially constructed to perform the method of the invention, or it may be a general purpose computer selectively activated or reconfigured by a computer program stored in the computer. General purpose computing machines may be used with programs written in accordance with the teachings herein, or a specialized computing apparatus may be constructed to perform the method described herein.

Figure 1:
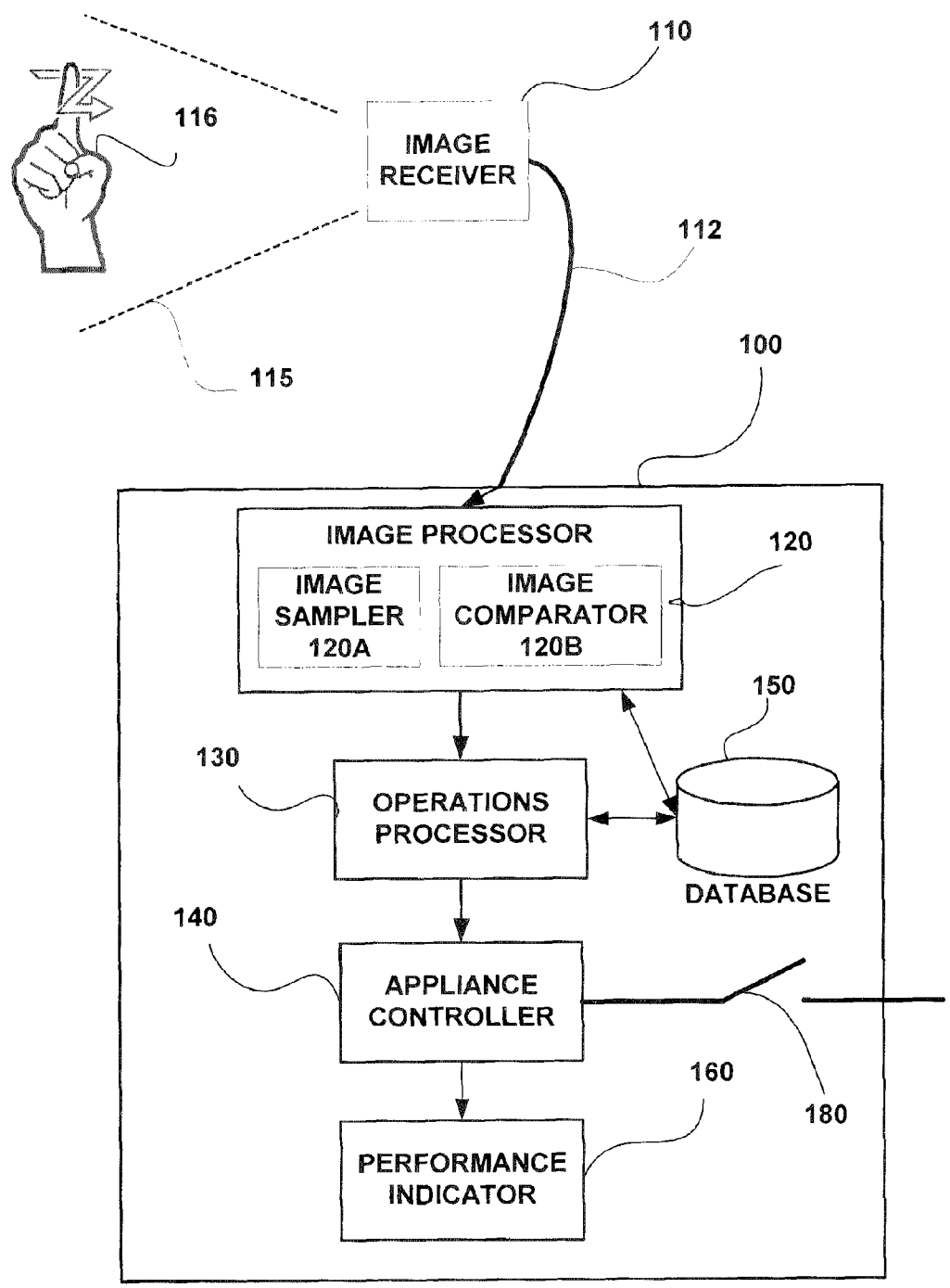
FIG. 1 is a block diagram of a device used to operate a home appliance in accordance with the present invention.

FIG. 1 is a block diagram of a device 100 for operating a home appliance (not shown) using gesture recognition in accordance with the present invention. As shown, the device 100 includes an image receiver 110 for receiving a continuous stream of gesture images. The image receiver 110 may be any PC-based camera or the like without departing from the principles of the present invention. The image receiver 110 transmits the video signals to an image processor 120 by way of a cable 112. The video signals may be sent in any format such as, for example, MPEG3 format or the like without departing from the principles of the present invention.

The image processor 120 forms a discrete sequence of gesture images based on the continuous stream of gesture images it receives from the image recover 110. In this manner and in one embodiment of the present invention, the image processor contains an image sampler 120A for forming a discrete sequence of gesture images from the received gesture images by sampling the continuous stream of images. In other words, the image sampler 120A segments the continuous stream of images into a series of frames or "snapshots."

The image processor 120 also derives positional data of the gestures in each frame, and compiles the positional data into a respective frame data set. The positional data in the frame data set is compared, in the image comparator 120B, to each of a set of stored sequences of positional data making up one or more recognizable gestures i.e., gestures already known to the system. Any gesture, such as, for example, a gesture associated with American Sign Language can be stored in a data store 150. In this regard, the comparator 120B can search the data store 150 to match the received gesture with a stored gesture by using the positional data of the data frame set of the received gesture to the positional data of one of the known sequences stored in the data store 150. The image comparator 120B, based on the comparison, determines whether the user within the field of view 115 of the image receiver 110 has performed a recognizable gesture.

Thus, the image receiver 110 can receive a continuous image of a gesture, which can be, for example, a person moving an arm horizontally across the chest. The image sampler 120A segments the gesture into frames. The image processor 120 then obtains positional data from each frame of the gesture sequence and compiles the data in a data frame set. Then, the image comparator 120B compares the positional data of the data frame set to the positional data of the recognizable gestures stored in the database.

Once a gesture is recognized (i.e., the system determines that the received image corresponds to a recognizable gesture), an operations processor 130 connected to the image processor 120 identifies a predefined home appliance operation associated with the recognized gesture. In one embodiment of the present invention, the operations processor 130 determines, based on the recognized gesture, which of a plurality of predefined home appliance operations is to be performed. In this manner, the operations processor can access the data store 150 to determine the predefined home appliance operation associated with the recognized gesture.

As shown and for example, one recognizable gesture 116 might include motioning the letter "z" with the index finger of the hand. In this regard, once the device 100 recognizes this gesture, the operations processor 130 searches the data store 150 to determine which home appliance operation is associated with motioning the letter "z" with the index finger. For example, this gesture might be associated with turning on the appliance. Another recognizable gesture, such as moving one arm horizontally across the chest, for example, might be associated with turning off the home appliance.

An appliance controller 140 is connected to the operations processor 130 for causing the predefined home appliance operation to be performed. In one embodiment of the present invention, the appliance controller is connected to a switch 180. In this manner, for example, if the predefined home appliance operation is turning on the appliance, the appliance controller 140 can be configured to transmit an electrical signal that actuates switch 180 that turns on the appliance. Consequently, the appliance controller 140 is configured to actuate the power switch 180 that turns on the appliance if the gesture associated with powering on the appliance is performed and recognized by the device 100. In this regard, the appliance controller 140 may be a voltage generator for generating a voltage signal that actuates the power switch 180. Alternatively, the appliance controller 140 can be a pulse generator for generating a voltage pulse to actuate a switch 180 that may or may not be located within the appliance.

The device 100 in accordance with the present invention can also include a performance indicator 160, such as, for example, a sound generator connected to the appliance controller 140. The performance indicator 160 indicates the predefined home appliance operation has been performed. In one embodiment of the present invention, the performance indicator 160 is a sound generator that emits, in response to the appliance controller 140 causing the predefined home appliance operation to be performed, a sound to notify the user that the home appliance operation has occurred. This method of indication is particular useful if the home appliance operation cannot be visually verified, e.g. turning on an oven or the like.

In one embodiment of the invention, each home appliance operation is associated with a different audible sound. For example, immediately after turning on the appliance, the sound generator may emit a single beep. Conversely, immediately after turning off the appliance, the sound generator may emit a double beep. This notification method provides the user with an audible indication of what particular home appliance operation has been performed.

Figure 2A:
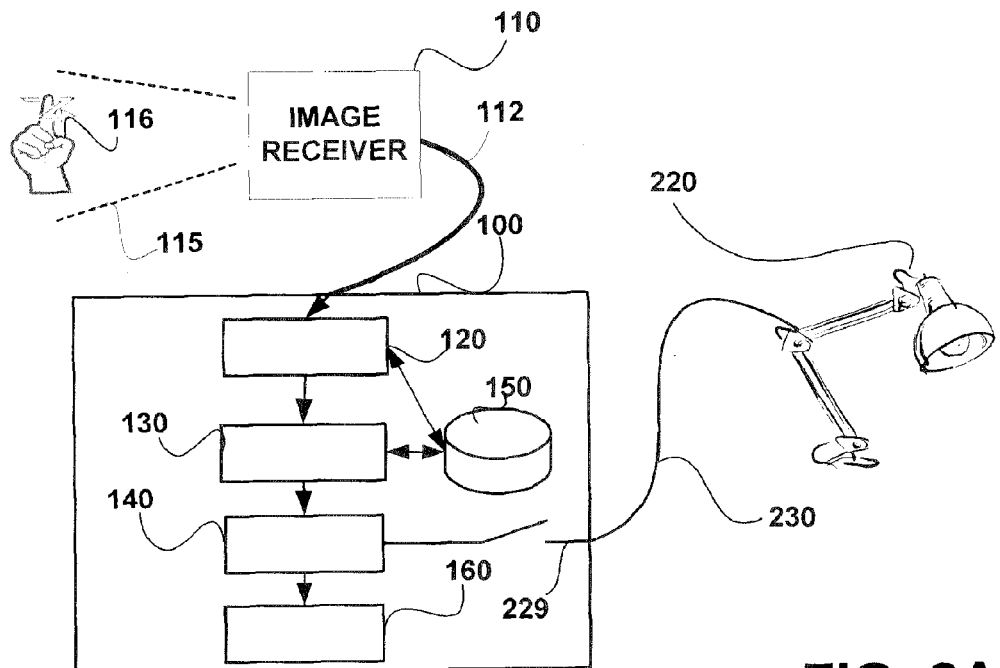
FIGS. 2A and 2B illustrate the device of FIG. 1 connected to home appliances.
Figure 2B:
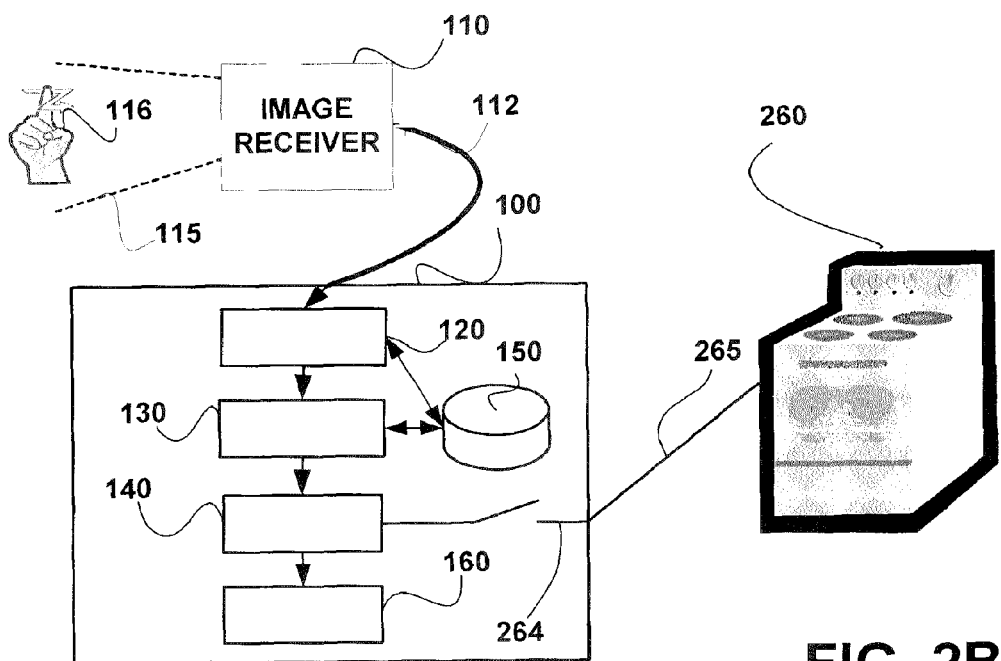

FIGS. 2A and 2B each illustrates the apparatus of FIG. 1 connected to a home appliance. As shown in FIG. 2A, lighting system 220 is connected to an apparatus 100 in accordance with the present invention. As described above, the apparatus 100 receives images by way of image receiver 110 and transmits the images to an image processor 120 through cable 112. The image processor 120 recognizes a sequence of gesture images based on the stream of gesture images received by the image receiver 110.

Once a gesture is recognized, an operations processor 130 connected to the image processor 120 identifies a predefined home appliance operation associated with that recognized gesture. An appliance controller 140 is connected to the operations processor 130 for causing the predefined home appliance operation to be performed. In this manner, for example, if the home appliance operation is turning on the lighting system 220, the appliance controller 140 is configured to turn on the lighting system 320 using switch 229. Consequently, the appliance controller 140 transmits a signal by way of cable 230 to the lighting system 220 if the gesture associated with powering on the lighting system 220 is performed and recognized. A performance indicator 160 connected to the appliance controller 140 emits, in response to the appliance controller 140 turning on the lighting system 220, an indication to notify the user that the lighting system 220 is on.

Similarly, as shown in FIG. 2B, an oven 260 is connected to an apparatus 100 in accordance with the present invention by cable 265. Again, as described above, the apparatus 100 receives images of a gesture 116 by way of image receiver 110 and transmits the images to image processor 120 through cable 112. Image processor 120 recognizes a sequence of gesture images based on the stream of gesture images received by the image receiver 110.

Once a gesture is recognized, an operations processor 130 connected to the image processor 120 identifies which predefined home appliance operation is associated with the recognized gesture. An appliance controller 140 is connected to the operations processor 130 for causing the predefined home appliance operation associated with the recognized gesture to be performed. In this manner, for example, if the home appliance operation is turning off the oven 260, the appliance controller 140 is configured to turn off the oven 260 by way of switch 264. Consequently, the appliance controller 140 causes the oven 260 to be turned on if the gesture associated with powering on the oven 260 is performed and recognized. A performance indicator 160 connected to the appliance controller 140 indicates, after the appliance controller 140 is turned on, that the oven 260 is on.

The operations processor 130 can also include programming and logic that enable it to provide more sophisticated signals to the home appliance. For example, where the home appliance is an oven, the operations processor can be programmed to send any of a number of various signals to the oven, thereby causing the oven to perform any number of operations. For example, a first recognizable gesture can be associated with turning the oven on, a second gesture can be associated with setting the oven temperature, a third gesture can be associated with setting a cooking timer, a fourth gesture can be associated with turning on the oven's internal light, and a fifth gesture can be associated with turning the oven off. Each such recognizable gesture would be associated with the corresponding operation in the system's data store.

Depending on the gesture the recognized, the operations processor can send a signal to the oven's computer that emulates the signal the oven's computer would have received is the user had pushed the appropriate buttons on the oven itself. For example, pushing the oven on button might cause a certain signal to be sent to the oven's computer. The oven's computer then turn the oven on. Accordingly, the operations processor of the invention can send the same signal directly to the oven's computer, thereby causing the oven's computer to turn the oven on.

Figure 3:
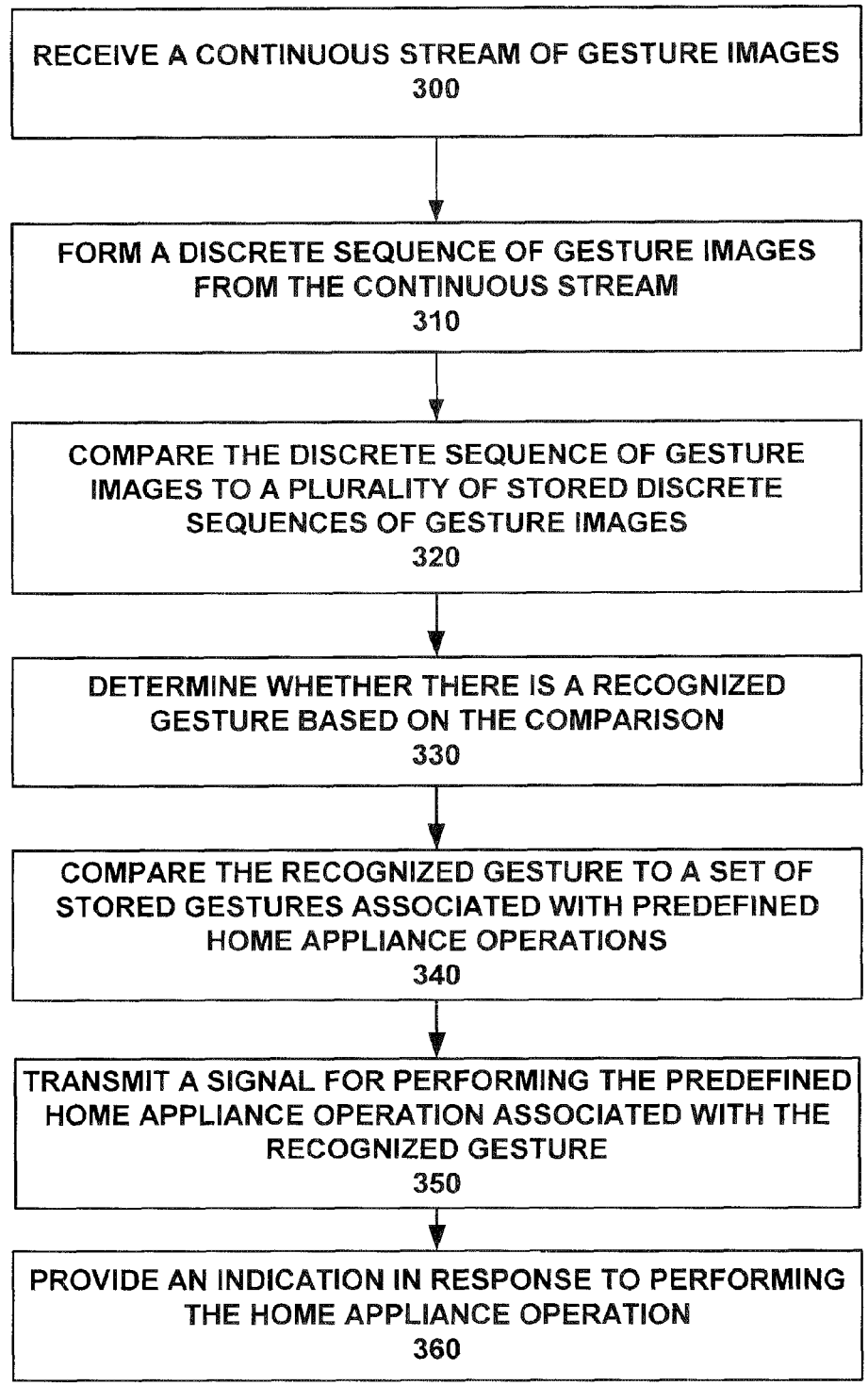
FIG. 3 is flowchart illustrating a method of operating a home appliance in accordance with the present invention.

FIG. 3 is flowchart illustrating a method of operating a home appliance in accordance with the present invention. In the method, a user performs a gesture within the field of view of an image receiver, such as a camera. Thus, the image receiver receives a continuous stream of gesture images at step 300. The system uses the continuous image stream to determine whether the gesture that the user is making is one of a set of one or more recognizable gestures. In one embodiment of the present invention, the gesture is recognized by first forming a discrete sequence of gesture images from the continuous image stream at step 310. Then, using positional data in a data frame set derived from each frame, the discrete sequence of gesture images is compared, at step 320, to a set of one or more stored sequences of discrete gesture images. Based on the comparison, the system determines, at step 330, whether the performed gesture is one of the set of recognizable gestures.

At step 340, the recognized gesture is identified with a predefined home appliance operation. The recognized gesture is compared to a set of stored gestures, each gesture being associated with a predefined home appliance operation. Once the predefined operation identified with the recognized gesture is found, the system causes the predefined home appliance operation to be performed at step 350. At step 360, an indication can be provided to indicate to the user that the operation has been performed.

Thus, there have been described systems and methods for operating a home appliance using gesture recognition technology. Though the invention has been described with reference to a device that is external and connectable to a home appliance, it is it contemplated that such a device may be integrated into such an appliance. Consequently, the device in accordance with the principles of the present invention should not be limited to a device that is separate from the home appliance. Those skilled in the art will appreciate that numerous other changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

What is claimed is:

1. A method, comprising:
   receiving a sequence of images;
   comparing, by a processor, the sequence of images to another sequence of gesture images stored in memory; and
   associating a gesture image in the another sequence of gesture images to an operation of an appliance.

2. The method according to claim 1, further comprising sampling a video signal to obtain the sequence of images.

3. The method according to claim 1, further comprising associating the gesture image to the appliance.

4. The method according to claim 1, further comprising generating a voltage in response to the operation.

5. The method according to claim 1, further comprising indicating that the operation has been performed.

6. The method according to claim 1, further comprising at least one of turning on an oven and turning off the oven.

7. The method according to claim 1, further comprising setting a temperature.

8. The method according to claim 1, further comprising at least one of turning on a light and turning off the light.

9. The method according to claim 1, further comprising at least one of opening a switch and closing the switch.

10. The method according to claim 1, further comprising generating a sound.

11. A system, comprising:
    a processor executing code stored in memory that causes the processor to:
    receive a sequence of images;
    compare, by a processor, the sequence of images to another sequence of gesture images stored in memory;
    select an image in the sequence of images that matches a gesture image in the another sequence of gesture images; and
    associate the gesture image to an operation of an appliance.

12. The system according to claim 11, further comprising code that causes the processor to sample a video signal to obtain the sequence of images.

13. The system according to claim 11, further comprising code that causes the processor to associate the gesture image to the appliance.

14. The system according to claim 11, further comprising code that causes the processor to generate a voltage in response to the operation.

15. The system according to claim 11, further comprising code that causes the processor to indicate that the operation has been performed.

16. The system according to claim 11, further comprising code that causes the processor to at least one of turn on an oven and turn off the oven.

17. The system according to claim 11, further comprising code that causes the processor to set a temperature.

18. The system according to claim 11, further comprising code that causes the processor to at least one of turn on a light and turn off the light.

19. The system according to claim 11, further comprising code that causes the processor to at least one of open a switch and close the switch.

20. The system according to claim 11, further comprising code that causes the processor to generate a sound.

* * * * *